（12）United States Patent
Miyazaki

(10) Patent No.: US 7,487,091 B2
(45) Date of Patent: Feb. 3, 2009

(54) SPEECH RECOGNITION DEVICE FOR RECOGNIZING A WORD SEQUENCE USING A SWITCHING SPEECH MODEL NETWORK

(75) Inventor: Toshiyuki Miyazaki, Fujisawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 603 days.

(21) Appl. No.: 10/513,753

(22) PCT Filed: May 7, 2003

(86) PCT No.: PCT/JP03/05695

§ 371 (c)(1),
(2), (4) Date: Nov. 9, 2004

(87) PCT Pub. No.: WO03/096324

PCT Pub. Date: Nov. 20, 2003

(65) Prior Publication Data

US 2005/0203737 A1     Sep. 15, 2005

(30) Foreign Application Priority Data

May 10, 2002     (JP)     ............................... 2002-135770

(51) Int. Cl.
G10L 15/00     (2006.01)
G10L 15/28     (2006.01)
G10L 15/14     (2006.01)
(52) U.S. Cl. .................. 704/255; 704/251; 704/252; 704/231; 704/240; 704/256; 704/256.1
(58) Field of Classification Search ................ 704/240, 704/251, 246, 231, 252, 256.1
See application file for complete search history.

(56) References Cited

U.S. PATENT DOCUMENTS 5,749,069 A * 5/1998 Komori et al. ............... 704/240

(Continued)

FOREIGN PATENT DOCUMENTS

EP     0 903 728 A2     3/1999

(Continued)

OTHER PUBLICATIONS

Ganapathiraju, A.; Webster, L.; Trimble, J.; Bush, K.; Kornman, P., "Comparison of energy-based endpoint detectors for speech signal processing," Southeastcon '96. 'Bringing Together Education, Science and Technology'., Proceedings of the IEEE, vol., No., pp. 500-503, Apr. 11-14, 1996.*

(Continued)

Primary Examiner—Patrick N. Edouard
Assistant Examiner—Paras Shah
(74) Attorney, Agent, or Firm—Finnegan, Henderson, Farabow, Garrett & Dunner, L.L.P.

(57) ABSTRACT

A speech recognition device which can preferably be used for reducing the memory capacity required for speaker-independent speech recognition is provided. A matching unit loads speech models belonging to a first speech model network and a garbage model in a RAM, and gives a speech parameter extracted by a speech parameter extraction unit to the speech model in the RAM, and when an occurrence probability output from the garbage model is equal to or greater than a predetermined value, the matching unit loads speech models belonging to any of speech model groups in the RAM based on the occurrence probability output from the speech model belonging to the first speech model network.

9 Claims, 7 Drawing Sheets

U.S. PATENT DOCUMENTS

| | | | |
|---|---|---|---|
| 5,842,165 A * | 11/1998 | Raman et al. | 704/255 |
| 6,061,653 A * | 5/2000 | Fisher et al. | 704/256.5 |
| 6,073,095 A * | 6/2000 | Dharanipragada et al. | 704/242 |
| 6,073,097 A * | 6/2000 | Gould et al. | 704/251 |
| 6,076,054 A * | 6/2000 | Vysotsky et al. | 704/240 |
| 6,195,639 B1 * | 2/2001 | Feltstrom et al. | 704/252 |
| 6,230,128 B1 * | 5/2001 | Smyth | 704/236 |
| 6,697,782 B1 * | 2/2004 | Iso-Sipila et al. | 704/275 |
| 6,950,796 B2 * | 9/2005 | Ma et al. | 704/244 |
| 2002/0046028 A1 * | 4/2002 | Saito | 704/251 |
| 2002/0049593 A1 * | 4/2002 | Shao | 704/251 |
| 2003/0200086 A1 * | 10/2003 | Kawazoe et al. | 704/239 |

FOREIGN PATENT DOCUMENTS

| | | |
|---|---|---|
| EP | 1 083 405 A1 | 3/2001 |
| EP | 1 193 959 A2 | 4/2002 |
| EP | 1 197 950 A2 | 4/2002 |
| JP | 11-007292 | 1/1999 |
| JP | 11-015492 | 1/1999 |
| JP | 2000089782 | 3/2000 |
| JP | 2002-297182 | 10/2002 |
| WO | WO 00/58945 | 10/2000 |

OTHER PUBLICATIONS

K. Takeda et al., "on the Usage of Garbage HMMs in Understanding Spontaneous Speech", The Institute of Electronics, Information and Communication Engineers, SP92-127, (1993), pp. 33-40, vol. 92, No. 410, Abstract.

K. Takeda et al., "Garbage Model to Kobunteki Kosoku O Mochiita Word Spotting No Kento", The Acoustical Society of Japan (ASJ) Heisei 4 nendo Shuki Kenkyu Happyo Koen Ronbunshu, (1992), 2-1-17, pp. 111-112.

N. Inoue et al., "a Method to Deal With Out-of-Vocabulary Words in Spontaneous Speech by Using Garbage HMM", The Transactions of the Institute of Electronics, Information and Communication Engineers, (1994), vol. J77-A, No. 2, pp. 215-222.

K. Shikano et al., "Digital Signal Processing of Speech/Sound Information", Index, yes.

H. Bourlard et al., "Optimizing Recognition and Rejection Performance in Wordspotting Systems", Proc. ICASSP, Adelaide, Austria, (1994), pp. I-373-I-376.

* cited by examiner

WORD SPEECH MODEL WITH NETWORK OF
PHONEMES LINKED IN SERIES

HMM STATE TRANSITION OF PHONEMES

FIG. 7
PHONEME SET
| VOWELS | a, i, u, e, o |
|---|---|
| FRICATIVE SOUNDS | f, z, s, z h, s h, h |
| AFFRICATIVE SOUNDS | d z, t s, d h, c h |
| PLOSIVE SOUNDS | b, p, d, t, g, k |
| SEMIVOWELS | w, r, y |
| NASAL SOUNDS | m, n, n g |
FIG. 8A
WORD SPEECH MODEL SHARED BETWEEN MEN AND WOMEN
WITH NETWORK OF PHONEMES LINKED IN SERIES
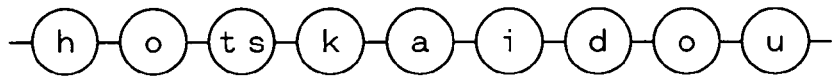
FIG. 8B
HMM STATE TRANSITION OF PHONEMES
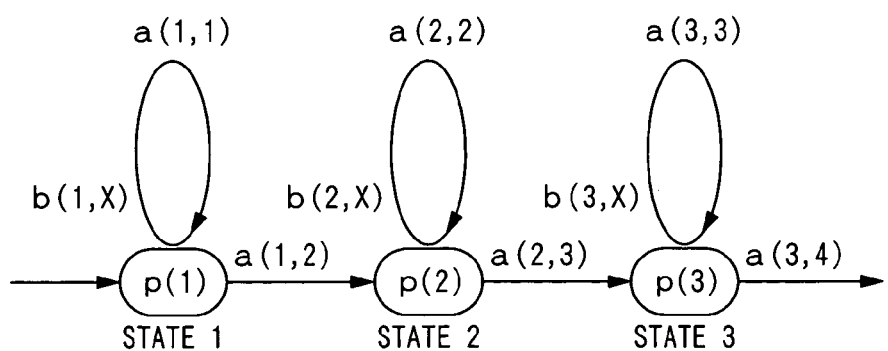

SPEECH RECOGNITION DEVICE FOR RECOGNIZING A WORD SEQUENCE USING A SWITCHING SPEECH MODEL NETWORK

This application claims priority under 35 U.S.C. 119 to Japanese Application No. 2002-135770, filed May 10, 2002, the disclosure of each which is expressly incorporated herein by reference in its entirety.

TECHNICAL FIELD

The present invention relates to a system recognizing speech based on a speech model for speaker independent speech recognition, and particularly to a speech recognition device which can preferably be used for-reducing the memory capacity required for speaker independent speech recognition.

BACKGROUND ART

Generally, the technique for recognizing speech on an unspecified person is called speaker independent speech recognition, and the technique for recognizing speech on a specified person is called speaker dependent speech recognition.

As one of methods for recognizing speech, for example, speech is recognized using a speech model modeled with a speech parameter for each phoneme with phonemes composing one word defined as a speech unit. Taking a word of "Hokkaido" as an example, a speechmodel of "Hokkaido" is created with a network having nine phonemes of "h", "o", "ts", "k", "a", "i", "d", "o" and "u" linked in series. In addition, for recognition of another word such as "Aomori" or "Akita", a speech model matching the word should be prepared. In the case of speaker independent speech recognition, this speech model is modeled with speech parameters common to many persons.

As a technique for speaker independent speech recognition using the speech model of phonemes, Hidden Markov Model (hereinafter referred to simply as HMM) has been generally known, and is described in detail in, for example, "Digital signal Processing of Speech/Sound Information" (under joint authorship of Kiyohiro Shikano, Tetsu Nakamura and Shiro Ise, SHOKODO CO., LTD.).

A method for speaker independent speech recognition by HMM will be briefly described with reference to FIGS. 7, 8A and 8B. FIG. 7 shows a phoneme set with phonemes classified into predetermined sections. FIGS. 8A and 8B show a concept of a speech model modeled with a network of phonemes linked in series.

According to HMM, in the case of Japanese language, one word is first composed by a network of phonemes linked in series using any phonemes of vowels, fricative sounds, affricative sounds, plosive sounds, semivowels and nasal sounds, as shown in FIG. 7. A state transition matching the word is created and for each state, a transition probability representing a probability of making a transition to a next state, and an output probability representing a probability of outputting a speech parameter when making a transition to the next state are specified, whereby a speech model is created. For example, the speech model for the word of "Hokkaido" can be modeled with a network of nine phonemes linked in series in the order of speaking as shown in FIG. 8A. The state transition of HMM of each phoneme is shown in FIG. 8B.

Here, a(I,J) in FIG. 8B shows a transition probability from state I to state J and for example, a(1,1) in the figure shows a transition probability from state 1 to state 1.

Furthermore, b(I,x) shows an output probability in state I when the speech parameter x is obtained, and b(I,x) in the figure shows an output probability of state 1 when the speech parameter x is obtained.

Furthermore, p(I) in FIG. 8B shows a probability of state I, and is expressed by the following formula (1).

$$P(I) = \max(p(I) \times a(I,I), (I-1) \times a(I-1,I)) \times b(I,X) \quad (1)$$

In the above formula (1), "max" is a function selecting a maximum value of arguments.

Recognition of speech having a relatively long word sequence using a plurality of speech models like this will now be described in detail with reference to FIG. 9. Examples thereof include recognition of speech of a word sequence having the name of a prefecture and the name of a city, town or village linked like an address or the like. FIG. 9 shows the configuration of a speech model network 500.

As shown in FIG. 9, the speechmodel network is comprised of a pose 502 detecting a silent portion of input speech, a speech model group 504 having grouped a plurality of speech models capable of recognizing speech of the names of prefectures, a speech model group 506 having grouped a plurality of speech models capable of recognizing speech of the names of cities under prefectures, a speech model group 508 having grouped a plurality of speech models capable of recognizing speech of the names of wards or towns under cities, a speech model group 510 having grouped a plurality of speech models capable of recognizing the names of districts under wards or towns, and a pose 512 detecting a silent portion of input speech.

The speech model group 504 has grouped speech models corresponding to prefectures and capable of recognizing speech of the names of the prefectures, and is linked to the pose 502.

The speech model group 506 has grouped speech models corresponding to cities and capable of recognizing speech of the names of the cities, and is linked to speech models belonging to the speech model group 504. In the example of FIG. 9, the speech model group 506 having grouped speech models capable of recognizing speech of the names of cities belonging to Kanagawa prefecture is linked to one of speech models belonging to the speech model group 504, which is capable of recognizing speech of Kanagawa prefecture.

The speech model group 508 has grouped speech models corresponding to wards or towns and capable of recognizing speech of the names of the wards or towns, and is linked to speech models belonging to the speech model group 506. In the example of FIG. 9, the speech model group 508 having grouped speech models capable of recognizing speech of the names of towns belonging to Fujisawa city is linked to one of speech models belonging to the speech model group 506, which is capable of recognizing speech of Fujisawa city.

The speech model group 510 has grouped speech models corresponding to districts and capable of recognizing speech of the name of districts, and is linked to speech models belonging to the speech model group 508. In the example of FIG. 9, the speech model group 510 having grouped speech models capable of recognizing speech of the names of districts belonging to North ward is linked to one of speech models belonging to the speech model group 508, which is capable of recognizing speech of North ward.

The pose 512 is linked to the speech model group 508 or speech model group 510.

Furthermore, in these link relationships, as a speech parameter is given, a change in occurrence probability is propagated in the order of the pose 502, the speech model group 504, the speech model group 506, the speech model group 508, the speech model group 510 and the pose 512, or in the order of the pose 502, the speech model group 504, the speech model group 506, the speech model group 508 and the pose 512.

In this way, for speaker independent speech recognition, a plurality of speech models are prepared in advance, and the speech models are placed in a memory such as a RAM to recognize speech.

In this method, however, as the number of linked words increases, the number of words explosively increases with words combined, the memory capacity required for speech recognition processing by the Viterbi algorithm or the like thus increases, and in a built-in system such as a car navigation, the memory capacity constituting the system increases. For example, if the name of a place in Japan is recognized, the number of words to be recognized is about 3500 in the speech model network capable of recognizing speech of a word sequence having the name of a prefecture followed by the name of a city, town or village, while the number of words to be recognized is greater than a hundred of thousands in the speech model network capable of recognizing a word sequence having the names of a prefecture and a city, town or village followed by the name of a ward, county or the like.

The present invention has been made in view of the unsolved problems of the prior art, and has, as its object the provision of a speech recognition device which can preferably used for reducing the memory capacity required for speaker independent speech recognition.

DISCLOSURE OF THE INVENTION

For achieving the above object, the speech recognition device according to an exemplary embodiment of the present invention is a speech recognition device comprising speech models modeled so that the possibility that specified speech is included in input speech is output as an occurrence probability based on a given speech parameter, and the occurrence probability increases when a specified speech parameter is given, extracting the speech parameter from input speech, and recognizing speech based on the extracted speech parameter and the speech models, wherein the device comprises speech model loading storage means for loading the speech models, a plurality of speech model groups each having grouped a plurality of speech models different in the specified speech parameter are constructed, and a speech model network specifying a predetermined link relationship for the speech model groups is constructed, and a speech model group having a link relationship with a plurality of speech model groups in the speech model network is defined as a primary speech model group, and a speech model group having a link relationship with the primary speech model group in the speech model network is defined as a secondary speech model group, and when speech is recognized, unspecified speech recognizing speech models modeled so that the occurrence probability increases when a speech parameter representing speech other than specified speech capable of being recognized by speech models belonging to the primary speech model group is given, and speech models belonging to the primary speech model group are loaded into the speech model loading storage means, and a speech parameter extracted from input speech is given to speech models in the speech model loading storage means, and speech models belonging to any of the secondary speech model groups are loaded into the speech model loading storage means based on an occurrence probability output from speech models belonging to the primary speech model group and an occurrence probability output from the unspecified speech recognizing speech models.

With this configuration, when speech is recognized, unspecified speech recognizing speech models and speech models belonging to the primary speech model group are loaded into the speech model loading storage means, and the speech parameter extracted from input speech is given to speech models in the speech model loading storage means. Speech models belonging to any of secondary speech model groups are loaded into the speech model loading storage means based on the occurrence probability output from speech models belonging to the primary speech model group and the occurrence probability output from the unspecified speech recognizing speech model.

Here, the primary speech model group and the secondary speech model group may have any link relationship and for example, the case where the secondary speech model group is linked to the rear of the primary speech model group or the case where the primary speech model group is linked to the rear of the secondary speech model group is conceivable. Here, the rear means the rear with respect to the direction in which a change in occurrence probability is propagated. This holds true for the link relationship of the primary speech model group and the unspecified speech recognizing speech model, or the secondary speech model group and the unspecified speech recognizing speech model. The same holds true in the speech recognition program and the speech recognition method used in exemplary embodiments of the invention.

Furthermore, the speech model is modeled in a predetermined speech unit, and the predetermined speech unit may be a phoneme or may be a sequence of phonemes. The same holds true in the speech recognition device, the speech recognition program, and the speech recognition method used in exemplary embodiments of the invention.

Furthermore, the speech model loading storage means stores speech models by any means and at any time, and may store speech models in advance, or may store speech models by input from outside, or the like, during operation of the main device without storing speech models in advance. The same holds true in the speech recognition device, the speech recognition program, and the speech recognition method used in exemplary embodiments of the invention.

Further, the speech recognition device according to an exemplary embodiment of the present invention is a speech recognition device comprising speech models modeled so that the possibility that specified speech is included in input speech is output as an occurrence probability based on a given speech parameter, and the occurrence probability increases when a specified speech parameter is given, extracting the speech parameter from input speech, and recognizing speech based on the extracted speech parameter and the speech models, wherein the device comprises:

a first speech model group having grouped a plurality of speech models different in the specified speech parameter;

a second speech model group having grouped a plurality of speech models different in the specified speech parameter and having a link relationship with any speech model belonging to the first speech model group;

a third speech model group having grouped a plurality of speech models different in the specified speech parameter and having a link relationship with any other speech model belonging to the first speech model group;

unspecified speech recognizing speech models modeled so that the occurrence probability increases when a speech parameter representing speech other than specified speech capable of being recognized by speech models belonging to the first speech model group is given;

speech model loading storage means for loading the speech models;

speech parameter extraction means for extracting the speech parameter from input speech; and speech recognition means for recognizing speech based on speech models belonging to the first speech model group, the second speech model group and the third speech model group, and the speech parameter extracted by the speech parameter extraction means, and the speech recognition means loads speech models belonging to the first speech model group and the unspecified speech recognizing speech model in the speech model spreading storage means, gives the speech parameter extracted by the speech parameter extraction means to speech models in the speech model loading storage means, and loads speech models belonging to any of the second speech model group and the third speech model group in the speech model loading storage means based on an occurrence probability output from speech models belonging to the first speech model group and an occurrence probability output from the unspecified speech recognizing speech model.

With this configuration, when speech is input from a person, the speech parameter is extracted from input speech by the speech parameter extraction means. By the speech recognition means, speech models belonging to the first speech model group and the unspecified speech recognizing speech model are loaded into the speech model loading storage means, and the extracted speech parameter is given to speech models in the speech model loading storage means. Speech models belonging to any of the second speech model group and the third speech model group are loaded into the speech model loading storage means based on the occurrence probability output from speech models belonging to the first speech model group and the occurrence probability output from the unspecified speech recognizing speech model.

Here, the first speech model group, the second speech model group and the third speech model group may have any link relationship and for example, the case where the second speech model group and the third speech model group are linked to the rear of the first speech model group or the case where the first speech model group is linked to the rear of the second speech model group and third speech model group is conceivable. Here, the rear means the rear with respect to the direction in which a change in occurrence probability is propagated. This holds true for the link relationship of the first speech model group and the unspecified speech recognizing speech model, or the link relationship of the second speech model group and the third speech model group and the unspecified speech recognizing speech model.

Further, the speech recognition device according to a further exemplary embodiment of the present invention is a speech recognition device wherein the speech recognition means gives the speech parameter extracted by the speech parameter extraction means to speech models in the speech model loading storage means, and when an occurrence probability output from the unspecified speech recognizing speech model is equal to or greater than a predetermined value, and loads speech models belonging to any of the second speech model group and the third speech model group in the speech model loading storage means based on the occurrence probability output from speech models belonging to the first speech model group.

With this configuration, the extracted speech parameter is given to speech models in the speech model loading storage means by the speech recognition means. When the occurrence probability output from the unspecified speech recognizing speech model is equal to or greater than a predetermined value, speech models belonging to any of the second speech model group and the third speech model group are loaded into the speech model loading storage means based on the occurrence probability output from speech models belonging to the first speech model group.

Further, the speech recognition device according to an even further exemplary embodiment of the present invention is a speech recognition device, wherein the speech recognition means gives the speech parameter extracted by the speech parameter extraction means to speech models in the speech model loading storage means, and when an occurrence probability output from the unspecified speech recognizing speech model is equal to or greater than the predetermined value, removes speech models belonging to the first speech model group and the unspecified speech recognizing speech model from the speech model loading storage means, and loads speech models belonging to any of the second speech model group and the third speech model group in the speech model loading storage means based on the occurrence probability output from speech models belonging to the first speech model group.

With this configuration, the extracted speech parameter is given to speech models in the speech model loading storage means by the speech recognition means. When the occurrence probability output from the unspecified speech recognizing speech model is equal to or greater than a predetermined value, speech models belonging to the first speech model group and the unspecified speech recognizing speech model are removed from the speech model loading storage means, and speech models belonging to any of the second speech model group and the third speech model group are loaded into the speech model loading storage means based on the occurrence probability output from speech models belonging to the first speech model group.

Further, the speech recognition device according to an even further exemplary embodiment of the present invention is a speech recognition device, wherein the unspecified speech recognizing speech model is linked to speech models belonging to the first speech model group, and as the speech parameter is given, a change in the occurrence probability is propagated in the order of speech models of the first speech model group and the unspecified speech recognizing speech model.

With this configuration, the extracted speech parameter is given to speech models in the speech model loading storage means by the speech recognition means. A change in the occurrence probability is thus propagated in the order of speech models of the first speech model group and the unspecified speech recognizing speech model.

Further, the speech recognition device according to an even further exemplary embodiment of the present invention is a speech recognition device, wherein the device further comprises speech parameter storage means for storing the speech parameter, the speech parameter extraction means extracts the speech parameter from input speech, and stores the extracted speech parameter in the speech parameter storage means in a predetermined order, and the speech recognition means reads the speech parameter from the speech parameter storage means in the predetermined order, and gives the read speech parameter to speech models of the speech model loading storage means, and when an occurrence probability output from the unspecified speech recognizing speech model is equal to or greater than the predetermined value, loads speech models belonging to any of the second speech model group and the third speech model group in the speech model loading storage means based on an occurrence probability output from speech models belonging to the first speech model group, shifts the position of read of the speech parameter in the speech parameter storage means back by a predetermined number in an order opposite to the predetermined order, reads the speech parameter from the read position in the predetermined order, and gives the read speech parameter to speech models in the speech model loading storage means.

With this configuration, when speech is input from a person, the speech parameter is extracted from input speech by the speech parameter extraction means, and the extracted speech parameter is stored in the speech parameter storage means in a predetermined order. By the speech recognition means, the speech parameter is read from the speech parameter storage means in a predetermined order, and the read speech parameter is given to speech models in the speech model loading storage means. When the occurrence probability output from the unspecified speech recognizing speech model is equal to or greater than a predetermined value, speech models belonging to any of the second speech model group and the third speech model group are loaded into the speech model loading storage means based on the occurrence probability output from speech models belonging to the first speech model group. The position of read of the speech parameter in the speech parameter storage means is rewound by a predetermined number in an order opposite to the predetermined order, the speech parameter is read from the read position in a predetermined order, and the read speech parameter is given to speech models in the speech model loading storage means.

Here, the speech parameter storage means stores the speech parameter by any means and at any time, and may store the speech parameter in advance, or may store the speech parameter by input from outside, or the like, during operation of the main device without storing the speech parameter in advance.

Further, the speech recognition device according to an even further exemplary embodiment of the present invention is a speech recognition device, wherein the speech recognition means specifies as a recognition speech model a speech model of which the occurrence probability is the highest from the first speech model group, loads speech models belonging to one of the second speech model group and the third speech model group, which has a link relationship with the recognition speech model in the speech model loading storage means, calculates time required until a change in the occurrence probability is propagated from the recognition speech model to the unspecified speech recognizing speech model, and rewinds to the position of read of the speech parameter in the speech parameter storage means by a number corresponding to the time required.

With this configuration, by the speech recognition means, a speech model, of which the occurrence probability is the highest, is specified from the first speech model group as a recognition speech model, and speech models belonging to one of the second speech model group and the third speech model group, which has a link relationship with the recognition speech model, are loaded into the speech model loading storage means. Time required until a change in the occurrence probability is propagated from the recognition speech model to the unspecified speech recognizing speech model is calculated, and the position of read of the speech parameter in the speech parameter storage means is rewound by a number corresponding to the time required.

Further, the speech recognition device according to an even further exemplary embodiment of the present invention is the speech recognition device, wherein the speech recognition means rewinds to the position of read of the speech parameter in the speech parameter storage means from the read position at the time of specifying the recognition speech model by a number corresponding to the time required.

With this configuration, by the speech recognition means, the position of read of the speech parameter in the speech parameter storage means is rewound from the read position at the time of specifying the recognition speech model by a number corresponding to the calculated required time.

Further, the speech recognition device according to an even further exemplary embodiment of the present invention is a speech recognition device, wherein instead of speech models belonging to the second speech model group and the third speech model group, pronunciation indicating character strings indicating the pronunciation of specified speech capable of being recognized by the speech models are stored in the speech model loading storage means, and speech model templates capable of constructing the speech models based on the pronunciation indicating character strings are stored in the speech model loading storage means in a number equivalent to the number of speech models belonging to the second speech model group or the number of speech models belonging to the third speech model group, whichever is greater, and if speech models belonging to any of the second speech model group and the third speech model group are loaded into the speech model loading storage means, the speech recognition means constructs the speech model from speech model templates in the speech model loading storage device based on those of the pronunciation indicating character strings in the speech model loading storage means, which correspond to speech models to be loaded into the speech model loading storage means.

With this configuration, if speech models belonging to any of the second speech model group and the third speech model group are spread in the speech model loading storage means by the speech recognition means, speech models are constructed from speech model templates in the speech model loading storage means based on those of those of the pronunciation indicating character strings in the speech model loading storage means, which correspond to speech models to be spread in the speech model loading storage means, by the speech recognition means.

Further, the speech recognition device according to an even further exemplary embodiment of the present invention is a speech recognition device, wherein the speech recognition means specifies as a first recognition speech model a speech model, of which the occurrence probability is the highest, from the first speech model group, specifies as a second recognition speech model a speech model, of which the occurrence probability is the highest, from speech models of the second speech model group and the third speech model group, loaded into the speech model loading storage means, and determines that specified speech of the first recognition speech model integrated with specified speech of the second recognition speech model is included in input speech.

With this configuration, a speech model, of which the occurrence probability is the highest, is specified as a first recognition speech model from the first speech model group, and a speech model, of which the occurrence probability is the highest, is specified as a second recognition speech model from speech models of the second speech model group and the third speech model group, loaded into the speech model loading storage means by the speech recognition means. It is determined that specified speech of the first recognition speech model integrated with specified speech of the second recognition speech model is included in input speech.

Further, the speech recognition device according to an even further exemplary embodiment of the present invention is a speech recognition device, wherein the unspecified speech recognizing speech model is a garbage model.

With this configuration, when speech is input from a person, the speech parameter is extracted from input speech by the speech parameter extraction means. By the speech recognition means, speech models belonging to the first speech model group and the garbage model are loaded into the speech model loading storage means, and the extracted speech parameter is given to speech models in the speech model loading storage means. Based on the occurrence probability output from speech models belonging to the first speech model group and the occurrence probability output from the garbage model, speech models belonging to any of the second speech model group and the third speech model group are loaded into the speech model loading storage means.

For achieving the above object, the speech recognition program according to an exemplary embodiment of the present invention is a speech recognition program using speech models modeled so that the possibility that specified speech is included in input speech is output as an occurrence probability based on a given speech parameter, and the occurrence probability increases when a specified speech parameter is given, extracting the speech parameter from input speech, and recognizing speech based on the extracted speech parameter and the speech models, wherein the program causes a computer comprising speech model loading storage means for loading the speech models to perform processing, in which a plurality of speech model groups each having grouped a plurality of speech models different in the specified speech parameter are constructed, and a speech model network specifying a predetermined link relationship for the speech model groups is constructed, and a speech model group having a link relationship with a plurality of speech model groups in the speech model network is defined as a primary speech model group, and a speech model group having a link relationship with the primary speech model group in the speech model network is defined as a secondary speech model group, and when speech is recognized, unspecified speech recognizing speech models modeled so that the occurrence probability increases when a speech parameter representing speech other than specified speech capable of being recognized by speech models belonging to the primary speech model group is given, and speech models belonging to the primary speech model group are loaded into the speech model loading storage means, and a speech parameter extracted from input speech is given to speech models in the speech model loading storage means, and speech models belonging to any of the secondary speech model groups are loaded into the speech model loading storage means based on an occurrence probability output from speech models belonging to the primary speech model group and an occurrence probability output from the unspecified speech recognizing speech models.

With this configuration, an action comparable to that of the speech recognition device of an exemplary embodiment of the invention is obtained if the program is read by the computer and the computer performs processing according to the read program.

Further, the speech recognition program according to an exemplary embodiment of the present invention is a speech recognition program using speech models modeled so that the possibility that specified speech is included in input speech is output as an occurrence probability based on a given speech parameter, and the occurrence probability increases when a specified speech parameter is given, extracting the speech parameter from input speech, and recognizing speech based on the extracted speech parameter and the speech models, wherein the program causes a computer capable of using:

a first speech model group having grouped a plurality of speech models different in the specified speech parameter;

a second speech model group having grouped a plurality of speech models different in the specified speech parameter and having a link relationship with any speech model belonging to the first speech model group;

a third speech model group having grouped a plurality of speech models different in the specified speech parameter and having a link relationship with any other speech model belonging to the first speech model group;

unspecified speech recognizing speech models modeled so that the occurrence probability increases when a speech parameter representing speech other than specified speech capable of being recognized by speech models belonging to the first speech model group is given; and speech model loading storage means for loading the speech models to perform processing realized as speech parameter extraction means for extracting the speech parameter from input speech, and speech recognition means for recognizing speech based on speech models belonging to the first speech model group, the second speech model group and the third speech model group, and the speech parameter extracted by the speech parameter extraction means, and the speech recognition means loads speech models belonging to the first speech model group and the unspecified speech recognizing speech model in the speech model loading storage means, gives the speech parameter extracted by the speech parameter extraction means to speech models in the speech model loading storage means, and loads speech models belonging to any of the second speech model group and the third speech model group in the speech model loading storage means based on an occurrence probability output from speech models belonging to the first speech model group and an occurrence probability output from the unspecified speech recognizing speech model.

With this configuration, an action comparable to that of the speech recognition device of an exemplary embodiment of the present invention is obtained if the program is read by the computer and the computer performs processing according to the read program.

For achieving the above object, the speech recognition method according to an exemplary embodiment of the present invention is a speech recognition method using speech models modeled so that the possibility that specified speech is included in input speech is output as an occurrence probability based on a given speech parameter, and the occurrence probability increases when a specified speech parameter is given, extracting the speech parameter from input speech, and recognizing speech based on the extracted speech parameter and the speech models, wherein a plurality of speech model groups each having grouped a plurality of speech models different in the specified speech parameter are constructed, and a speech model network specifying a predetermined link relationship for the speech model groups is constructed, and a speech model group having a link relationship with a plurality of speech model groups in the speech model network is defined as a primary speech model group, and a speech model group having a link relationship with the primary speech model group in the speech model network is defined as a secondary speech model group, and when speech is recognized, unspecified speech recognizing speech models modeled so that the occurrence probability increases when a speech parameter representing speech other than specified speech capable of being recognized by speech models belonging to the primary speech model group is given, and speech models belonging to the primary speech model group are loaded into the speech model loading storage means, and a speech parameter extracted from input speech is given to speech models in the speech model loading storage means, and speech models belonging to any of the secondary speech model groups are loaded into the speech model loading storage means based on an occurrence probability output from speech models belonging to the primary speech model group and an occurrence probability output from the unspecified speech recognizing speech models.

Further, the speech recognition method according to an exemplary embodiment of the present invention is a speech recognition method using speech models modeled so that the possibility that specified speech is included in input speech is output as an occurrence probability based on a given speech parameter, and the occurrence probability increases when a specified speech parameter is given, extracting the speech parameter from input speech, and recognizing speech based on the extracted speech parameter and the speech models, wherein a first speech model group having grouped a plurality of speech models different in the specified speech parameter;

a second speech model group having grouped a plurality of speech models different in the specified speech parameter and having a link relationship with any speech model belonging to the first speech model group; and a third speech model group having grouped a plurality of speech models different in the specified speech parameter and having a link relationship with any other speech model belonging to the first speech model group are constructed, the method comprises:

a speech parameter extracting step of extracting the speech parameter from input speech; and a speech recognizing step of recognizing speech based on speech models belonging to the first speech model group, the second speech model group and the third speech model group, and the speech parameter extracted in the speech parameter extracting step, and in the speech recognizing step, unspecified speech recognizing speech models modeled so that the occurrence probability increases when a speech parameter representing speech other than specified speech capable of being recognized by speech models belonging to the first speech model group is given, and speech models belonging to the first speech model group are loaded into speech model loading storage means, the speech parameter extracted in the speech parameter extracting step is given to speech models in the speech model loading storage means, and speech models belonging to any of the second speech model group and the third speech model group are loaded into the speech model loading storage means based on an occurrence probability output from speech models belonging to the first speech model group and an occurrence probability output from the unspecified speech recognizing speech model.

BRIEF DESCRIPTION OF THE DRAWINGS

FIGS. 2A and 2B show a concept of a speech model modeled with a network of phonemes linked in series, in which FIG. 2A shows a word speech model with phonemes linked in series, and FIG. 2B shows the HMM state transition of each phoneme;

FIG. 7 shows a phoneme set classified in to predetermined sections;

FIGS. 8A and 8B show a concept of a speech model modeled with a network of phonemes linked in series, in which FIG. 8A shows a word speech model shared between men and women with a network of phonemes linked in series, and FIG. 8B shows the HMM state transition of each phoneme.

BEST MODE FOR CARRYING OUT THE INVENTION

The first embodiment of the present invention will be described below with reference to the drawings. FIGS. 1, 2A and 2B, and 3 to 6 show the first embodiment of a speech recognition device according to the present invention.

Figure 1:
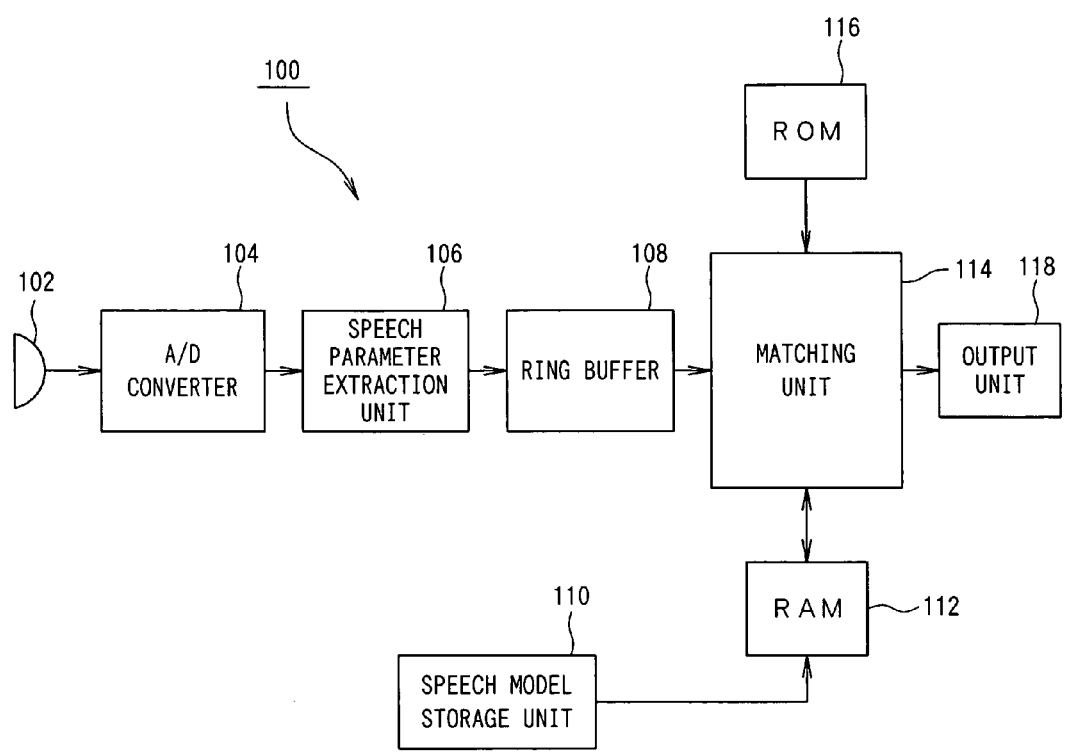
FIG. 1 is a block diagram showing the configuration of a speech recognition device 100.

In this embodiment, the speech recognition device according to the present invention is applied for recognition of speech of a relatively long word sequence such as an address using a speech model network with a plurality of speech models linked, as shown in FIG. 1.

First, the configuration of a speech recognition device 100 will be described with reference to FIG. 1. FIG. 1 is a block diagram showing the configuration of the speech recognition device 100.

The speech recognition device 100 has a function same as that of a general computer having a CPU, a ROM, a RAM, an I/F and the like bus-connected thereto, and is comprised of a microphone 102, an A/D converter 104 A/D-converting input speech from the microphone 102, a speech parameter extraction unit 106 extracting a speech parameter from speech data converted by the A/D converter 104, a ring buffer 108 storing the speech parameter extracted by the speech parameter extraction unit 106, a speech model storage unit 110 storing speech models, a RAM 112 for loading speech models in the speech model storage unit 110, a matching unit 114, a ROM 116 storing programs and the like of the speech parameter extraction unit 106 and the matching unit 114, and an output unit 118 outputting the recognition result of the matching unit 114, as shown in FIG. 1.

The ring buffer 108 has a predetermined storage area for storing the speech parameter. In write into the ring buffer 108, the speech parameter extracted by the speech parameter extraction unit 106 is written into an address indicated by a write pointer, and the write pointer is incremented by 1. However, when the write pointer reaches an address at the end of the storage area, the write pointer is set to an address at the head. By repeating this, the speech parameter is circularly written into the ring buffer 108 in the order of extraction from the speech parameter extraction unit 106. The write pointer is controlled by the speech parameter extraction unit 106.

Furthermore, in read from the ring buffer 108, the speech parameter is read from an address indicated by a read pointer, and the read pointer is incremented by 1. However, when the read pointer reaches an address at the end of the storage area, the read pointer is set to an address at the head. By repeating this, the speech parameter is circularly read from the ring buffer 108 in the order of write into the ring buffer 108. The read pointer is controlled by the matching unit 114 and regulated so as not to outrun the write pointer.

The speech model storage unit 110 stores speech models modeled so that the possibility that specified speech is included in input speech is output as an occurrence probability based on a given speech parameter and the occurrence probability increases when a specified speech parameter is given.

Figure 2A:
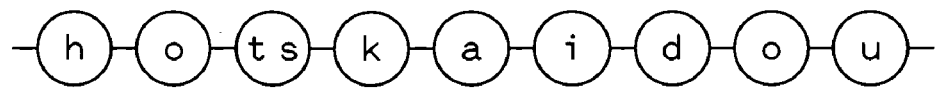
Figure 2B:
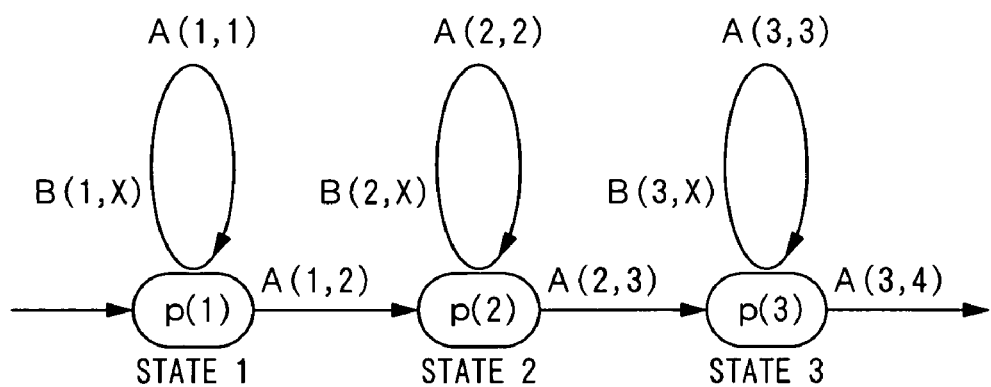

A method for speaker independent speech recognition by HMM will be briefly described with reference to FIGS. 2A and 2B. FIGS. 2A and 2B show a concept of a speech model modeled with a network of phonemes linked in series.

According to HMM, in the case of Japanese language, one word is first composed by a network of phonemes linked in series using any phonemes of vowels, fricative sounds, affricative sounds, plosive sounds, semivowels and nasal sounds. A state transition matching the word is created and for each state, a transition probability representing a probability of making a transition to a next state, and an output probability representing a probability of outputting a speech parameter when making a transition to the next state are specified, whereby a speech model is created. For example, the speech model for the word of "Hokkaido" can be modeled with a network of nine phonemes linked in series in the order of speaking as shown in FIG. 2A. The state transition of HMM of each phoneme is shown in FIG. 2B.

Here, a(I,J) in FIG. 2B shows a transition probability from state I to state J and for example, a(1,1) in the figure shows a transition probability from state 1 to state 1. Furthermore, b(I,x) shows an output probability in state I when the speech parameter x is obtained, and b(I,x) in the figure shows an output probability of state 1 when the speech parameter x is obtained.

Furthermore, p(I) in FIG. 2B shows a probability of state 1, and is expressed by the above formula (I).

If a plurality of speech models like this are used to recognize speech of a word sequence having the name of a prefecture and the name of a city, town or village linked like an address or the like, a speech model network having a plurality of speech models linked is built.

In this embodiment, the speech model network is constructed by units loaded onto the RAM 112, and is comprised of a first speech model network 300 and a second speech model network 400. The second speech model network 400 is logically linked to the rear of the first speech model network 300. Here, the rear means the rear with respect to the direction in which a change in occurrence probability is propagated.

Figure 3:
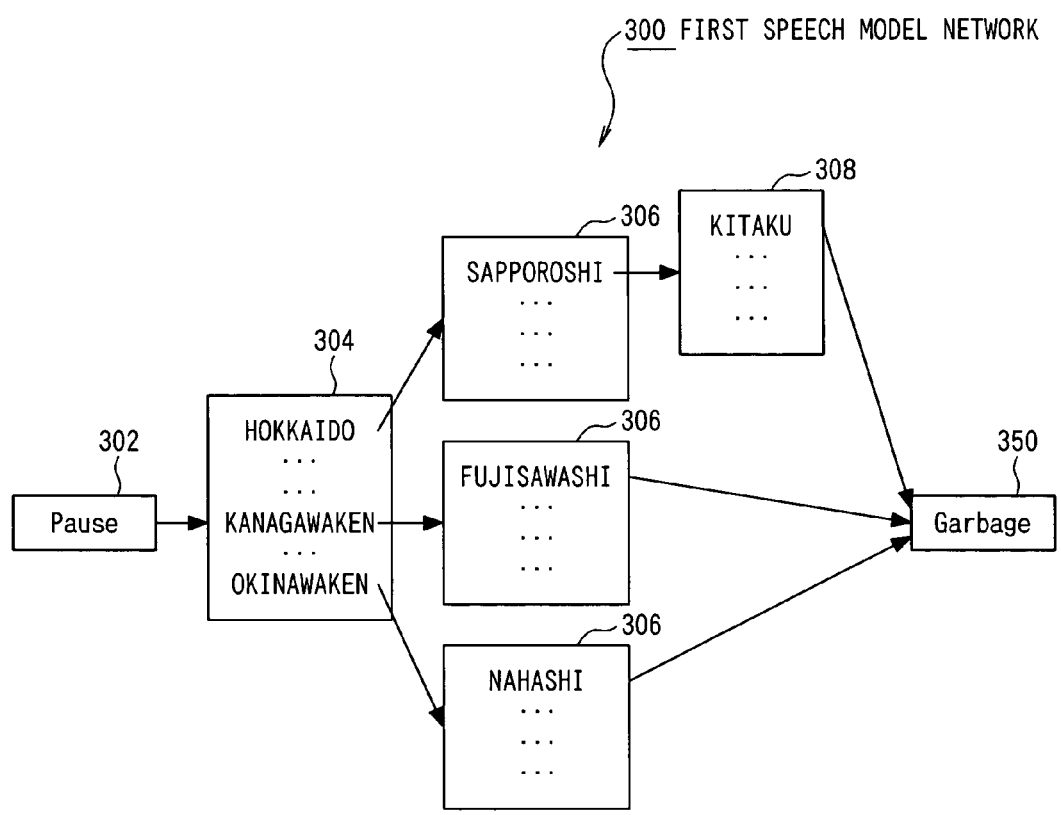
FIG. 3 shows the configuration of a first speech model network 300.

The configuration of the first speech model network 300 will be described in detail with respect to FIG. 3. FIG. 3 shows the configuration of the first speech model network 300.

As shown in FIG. 3, the first speech model network 300 is comprised of a pose 302 detecting a silent portion of input speech, a speech model group 304 having grouped a plurality of speech models capable of recognizing speech of the names of prefectures, a speech model group 306 having grouped a plurality of speech models capable of recognizing speech of the names of cities under prefectures, and a speech model group 308 having grouped a plurality of speech models capable of recognizing speech of the names of wards or towns under cities.

The speech model group 304 has grouped speech models corresponding to prefectures and capable of recognizing the names of the prefectures, and is linked to the pose 302.

The speech model group 306 has grouped speech models corresponding to cities and capable of recognizing the names of the cities, and is linked to each speech model belonging to the speech model group 304. In the example of FIG. 3, the speech model group 306 having grouped speech models capable of recognizing speech of the names of cities belonging to Kanagawa prefecture is linked to one of speech models belonging to the speech model group 304, which is capable of recognizing speech of Kanagawa prefecture.

The speech model group 308 has grouped speech models corresponding to wards or towns and capable of recognizing speech of the names of the wards or towns, and is linked to speech models belonging to the speech model group 306. In the example of FIG. 3, the speech model group 308 having grouped speech models capable of recognizing speech of the names of towns belonging to Fujisawa city is linked to one of speech models belonging to the speech model group 306, which is capable of recognizing speech of Fujisawa city.

Figure 4:
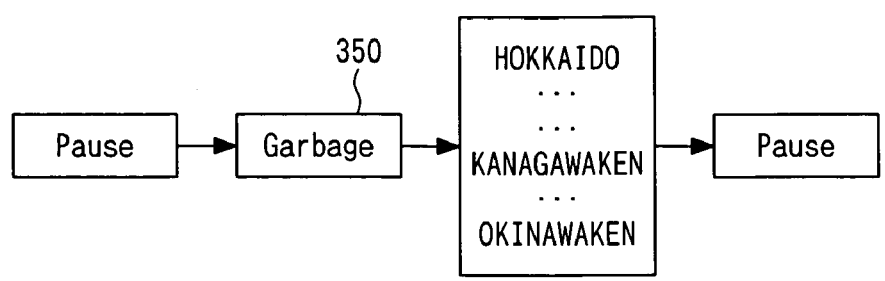
FIG. 4 shows the configuration of a garbage model 350.

Furthermore, a garbage model 350 is linked to the rear of the first speech model network 300. The garbage model 350 is modeled so that the occurrence probability increases when a speech parameter representing speech other than specified speech capable of being recognized by speech models belonging to the speech model group 304, the speech model group 306 and the speech model group 308 is given, and is linked to the speech model group 306 or speech model group 308. The garbage model 350 is a filler model for an unknown redundant word, and has a nature such that the occurrence probability (likelihood) increases if a word that does not exist in a sequence of speech models (hereinafter referred to as label sequence) existing on any path in the speech model network is spoken. For example, the example shown in FIG. 4 shows a speech model group recognizing only the names of prefectures, and improves the rate of recognition of the names of prefectures against a redundant word such as "anoh" or "sonoh" before the name of the prefecture. For description of the garbage model 350, see existing literature "H. Boulard, B. D'hoore and J.-M. Bolite, "Optimizing recognition and Rejection Performance in Wordspotting Systems" "Porc. ICASSP, Adelaide, Austria, pp. 1-373-376, 1994".

Furthermore, in these link relationships, a change in occurrence probability is propagated in the order of the pose 302, the speech model group 304, the speech model group 306, the speech model group 308 and the garbage model 350, or in the order of the pose 302, the speech model group 304, the speech model group 306 and the garbage model 350 as the speech parameter is given.

Figure 5:
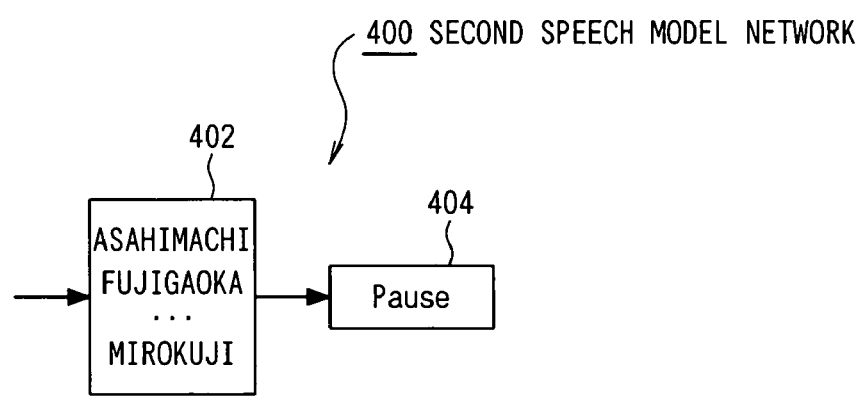
FIG. 5 shows the configuration of a second speech model network 400.

The configuration of the second speech model network 400 will now be described in detail with reference to FIG. 5. FIG. 5 shows the configuration of the second speech model network 400.

As shown in FIG. 5, the second speech model network 400 is comprised of a speech model group 402 having grouped a plurality of speech models capable of recognizing the names of districts under wards or towns and a pose 404 detecting a silent portion of input speech.

The speech model group 402 has grouped speech models corresponding to districts and capable of recognizing speech of the names of the districts, and is linked to the garbage model 350. In the example of FIG. 5, the speech model group 402 having grouped speech models capable of recognizing speech of the names of districts belonging to North ward is linked to the garbage model 350.

The pose 404 is linked to the speech model group 402.

The configuration of the matching unit 114 will now be described.

The matching unit 114 reads speech models belonging to the first speech model network 300 and the garbage model 350 from the speech model storage unit 110, and loads the read speech models and garbage model 350 in the RAM 112.

Then, a speech parameter is read from an address indicated by the read pointer in the ring buffer 108, and the read pointer is incremented by 1. However, when the read pointer reaches an address at the end of the storage area, the read pointer is set to an address at the head.

Then, the read speech parameter is given to speech models in the RAM 112. When the occurrence probability output from the garbage model 350 is equal to or greater than a predetermined value, a label sequence of which the accumulated value of occurrence probability is the highest is identified as a first recognition speech model from the first speech model network 300.

Then, speech models belonging to the first speech model network 300 and the garbage model 350 are removed from the RAM 112, speech models of the speech model group 402, which are to be linked to the end of the first recognition speech model, and the pose 404 are read from the speech model storage unit 110, and the read speech models and pose 404 are loaded into the RAM 112.

Then, time required until a change in occurrence probability is propagated from the first recognition speech model to the garbage model 350 is calculated, and the read pointer of the speech parameter in the ring buffer 108 is rewound by a number corresponding to the calculated required time. However, when the read pointer reaches the address at the head of the storage area, the read pointer is set to an address at the end.

The speech parameter is read from the address indicated by the read pointer in the ring buffer 108, and the read speech parameter is given to speech models in the RAM 112. A speech model, of which the accumulated value of occurrence probability is the highest, is thus specified as a second recognition speech model from the speech model group 402, and it is determined that specified speech of the first recognition speech model combined with specified speech of the second recognition speech model is included in input speech.

Figure 6:
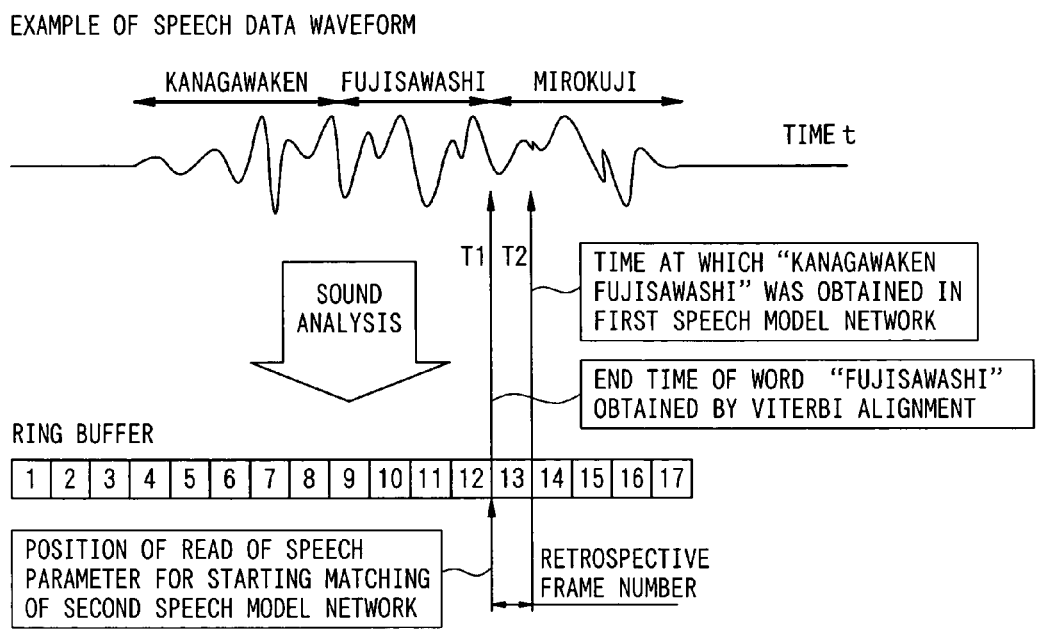
FIG. 6 is a time chart showing timing of switching between speech model networks.
Figure 9:
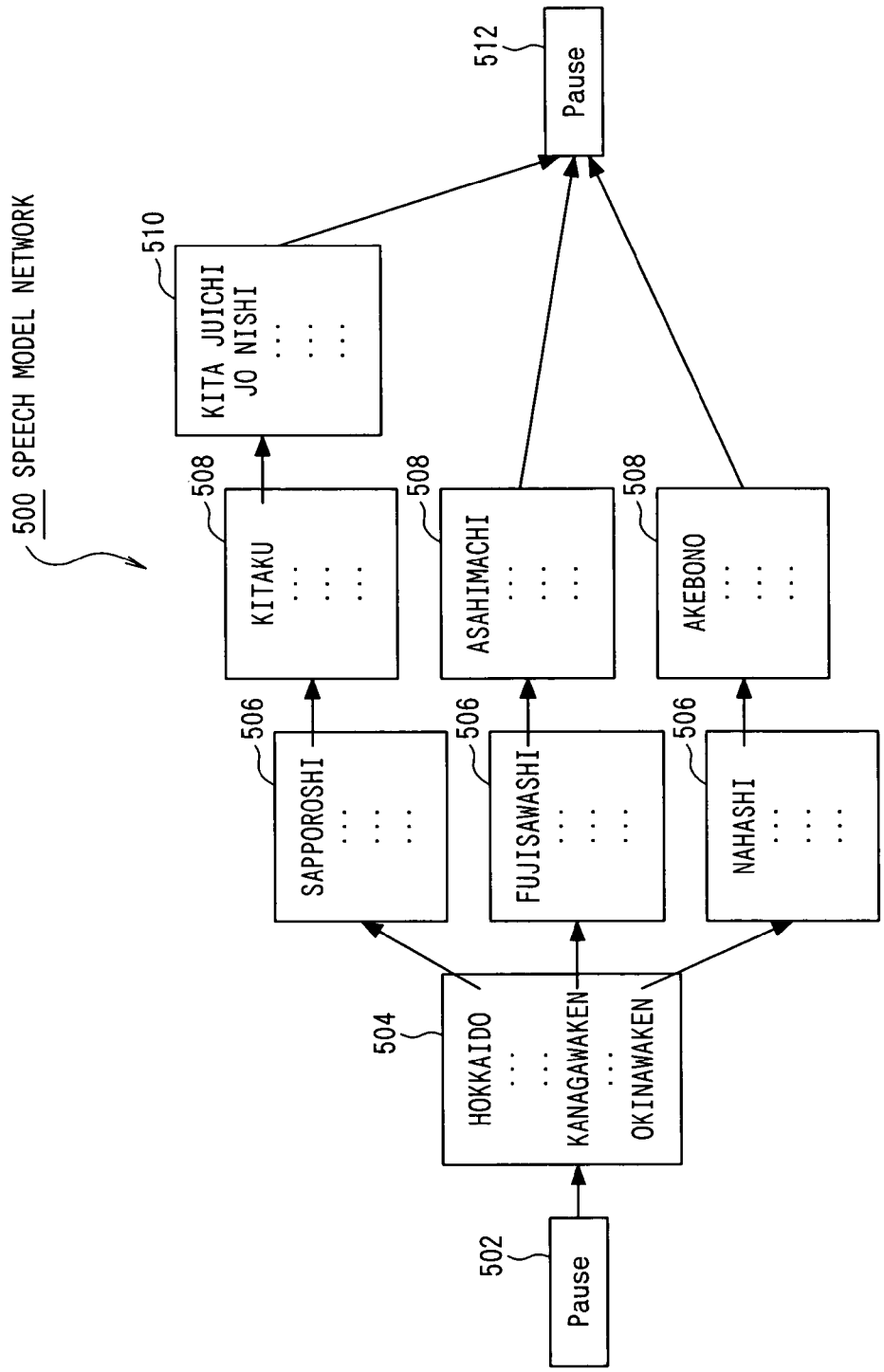
FIG. 9 shows the configuration of a speech model network 500.

The operation of this embodiment will now be described with reference to FIG. 6. FIG. 6 is a time chart showing timing of switching between speech model networks.

Here, the operation will be described taking, as an example, recognition of speech of a relatively long word sequence such as an address for use in a car navigation or the like.

For recognizing speech, by the matching unit 114, speech models belonging to the first speech model network 300 and the garbage model 350 are read from the speech model storage unit 110, and the read speech models and garbage model 350 are loaded into the RAM 112.

In this state, when speech from a person is input from the microphone 102, input speech from the microphone 102 is A/D-converted by the A/D converter 104, the speech parameter is extracted from speech data converted by the A/D converter 104 by the speech parameter extraction unit 106, and the extracted speech parameter is written into an address indicated by the write pointer in the ring buffer 108. In this way, the speech parameter is circularly written into the ring buffer 108 in the order of extraction from the speech parameter extraction unit 106.

Then, by the matching unit 114, the speech parameter is read from an address indicated by the read pointer in the ring buffer 108, and the read pointer is incremented by 1. At this time, when the read pointer reaches the address at the end of the storage area, the read pointer is set to an address at the head.

Then, the read speech parameter is given to speech models in the RAM 112. When the occurrence probability output from the garbage model 350 is equal to or greater than a predetermined value, a label sequence, of which the accumulated value of occurrence probability is the highest, is specified as a first recognition speech model from the first speech model network 300. In the example of FIG. 6, when speech of "Kanagawaken Fujisawashi Mirokuji" is input from a person, a speech model capable of recognizing specified speech of "Kanagawaken" is specified as a first recognition speech model in the speech model group 304, and a speech model capable of recognizing specified speech of "Fujisawashi" is specified as a first recognition speech model in the speech model group 306.

Then, speech models belonging to the first speech model network 300 and the garbage model 350 are removed from the RAM 112, speech models belonging to one of speech model groups 402 to be linked to the end of the first recognition speech model and the pose 404 are read from the speech model storage unit 110, and the read speech models and pose 404 are loaded into the RAM 112. In the example of FIG. 6, the speech model group 402 having grouped a plurality of speech models capable of recognizing the names of districts under Fujisawa city is linked to the end of the first recognition speech model, and therefore such a speech model group 402 is read.

Then, time required until a change in occurrence probability is propagated from the first recognition speech model to the garbage model 350 is calculated, and the read pointer of the speech parameter in the ring buffer 108 is rewound by a number corresponding to the calculated required time. At this time, when the read pointer reaches an address at the head of the storage area, the read pointer is set to an address at the end. The purpose of rewinding the read pointer is to reduce the influence of delay time until the occurrence probability of the garbage model 350 becomes equal to a predetermined value. In the example of FIG. 6, the read pointer is decremented by 1 as a retrospective frame number.

The speech parameter is read from an address indicated by the read pointer in the ring buffer 108, and the read speech parameter is given to speech models in the RAM 112. A speech model, of which the accumulated value of occurrence probability is the highest, is thus specified as a second recognition speech model from the speech model group 402. In the example of FIG. 6, when speech of "Kanagawaken Fujisawashi Mirokuji" is input from a person, a speech model capable of recognizing specified speech of "Mirokuji" is specified as the second recognition speech model in the speech model group 402. When the first recognition speech model and the second recognition speech model are specified, it is determined that specified speech of the first recognition speech model combined with specified speech of the second recognition speech model is included in input speech. That is, it is determined that speech of "Kanagawaken Fujisawashi Mirokuji" is included in input speech.

EXAMPLE

Example of the present invention will now be described.

Speech models capable of recognizing speech of about 3500 words are included in the first speech model network 300, and the speech model group 402 having grouped speech models capable of recognizing speech of about 1000 words at the maximum is included in the second speech model network 400.

If all speech models belonging to the first speech model network 300 and the second speech model network 400 are loaded into the RAM 112 to recognize speech as in the conventional technique, the memory capacity required for loading speech models is about 20 (MByte), and the memory capacity required for speech recognition processing with the Viterbi algorithm or the like is about 1 (MByte), resulting in consumption of total 21 (MByte) of memory capacity.

On the other hand, if speech models belonging to the first speech model network 300 and the garbage model 350 are loaded into the RAM 112 to recognize speech in the pre-stage, they are removed, and then speech models belonging to the second speech model network 400 are loaded into the RAM 112 to recognize speech in the post-stage as in the present invention, the memory capacity required for loading speech models is about 1.4 (MByte), and the memory capacity required for speech recognition processing with the Viterbi algorithm or the like is about 0.5 (MByte), resulting in consumption of total 1.9 (MByte) of memory capacity. Thus, the required memory capacity could be reduced by 91% compared to the conventional technique.

In this way, in this embodiment, the matching unit 114 loads speech models belonging to the first speech model network 300 and the garbage model 350 in the RAM 112, gives the speech parameter extracted by the speech parameter extraction unit 106 to speech models in the RAM 112, and loads speech models belonging to any of speech model groups 402 in the RAM 112 based on the occurrence probability output from speech models belonging to the first speech model network 300 and the occurrence probability output from the garbage model 350.

In this way, even if speech is recognized using a plurality of speech model groups having a link relationship, speech models for all of speech model groups 402 are not required to be loaded, but speech models for any of speech model groups 402 should be loaded in the RAM 112, thus making it possible to reduce the memory capacity required for recognizing speech compared to the conventional technique.

Further, in this embodiment, the matching unit 114 gives the speech parameter extracted by the speech parameter extraction unit 106 to speech models in the RAM 112, and when the occurrence probability output from the garbage model 350 is equal to or greater than a predetermined value, the matching unit 114 removes speech models belonging to the first speech model network 300 and the garbage model 350 from the RAM 112, and loads speech models belonging to any of speech model groups 402 in the RAM 112 based on the occurrence probability output from speech models belonging to the first speech model network 300.

In this way, as speech models belonging to any of speech model groups 402 are loaded into the RAM 112, speech models belonging to the first speech model network 300 and the garbage model 350 are removed from the RAM 112, thus making it possible to reduce the memory capacity required for recognizing speech.

Further, in this embodiment, the garbage model 350 is linked to speech models belonging to the first speech model network 300, and as the speech parameter is given, a change in occurrence probability is propagated in the order of speech models of the first speech model network 300 and the garbage model 350.

In this way, the required memory capacity can be reduced when speech is recognized using a plurality of speech model groups having a hierarchical link relationship with the first speech model network 300 at a top level. For example, it is advantageous when speech of a relatively long word sequence such as an address or the like for use in a car navigation or the like as in this embodiment is recognized.

Further, in this embodiment, the speech parameter extraction unit 106 extracts the speech parameter from input speech, and stores the extracted speech parameter in the ring buffer 108 in a predetermined order, the matching unit 114 reads the speech parameter from the ring buffer 108 in a predetermined order, and gives the read speech parameter to speech models in the RAM 112, and when the occurrence probability output from the garbage model 350 is equal to or greater than a predetermined value, the matching unit 114 loads speech models belonging to any of speech model groups 402 in the RAM 112 based on the occurrence probability output from speech models belonging to the first speech model network 300, rewinds the read pointer of the speech parameter in the ring buffer 108 by a predetermined number in an order opposite to a predetermined order, reads the speech parameter from the read pointer in a predetermined order, and gives the read speech parameter to speech models in the RAM 112.

In this way, some delay time is required until the occurrence probability of the garbage model 350 becomes equal to a predetermined value, and therefore by turning back the read pointer in the ring buffer 108, the influence of delay time can be reduced to recognize speech relatively accurately when speech is recognized using speech models belonging to any of speech model groups 402.

Further, in this embodiment, the matching unit 114 identifies as a first recognition speech model a label sequence, of which the occurrence probability is the highest, from the first speech model network 300, loads speech models belonging to one of speech model groups 402 having a link relationship with the first recognition speech model in the RAM 112, calculates time required until a change in occurrence probability is propagated from the first recognition speech model to the garbage model 350, and rewinds the read pointer of the speech parameter in the ring buffer 108 by a number corresponding to the time required.

In this way, the read pointer of the speech model is rewound by a number corresponding to time taken until a change in occurrence probability is propagated from the first recognition speech model to the garbage model 350, and therefore the influence of delay time can be further reduced to recognize speech more accurately when speech is recognized using speech models belonging to any of speech model groups 402.

Further, in this embodiment, the matching unit 114 rewinds the read pointer of the speech parameter in the ring buffer 108 from the read pointer at the time of specifying the first recognition speech model by a number corresponding to the time required.

In this way, the read pointer of the speech parameter is rewound by a number corresponding to time taken until a change in occurrence probability is propagated from the first recognition speech model to the garbage model 350, with respect to the read pointer at the time of specifying the first recognition speech model, and therefore the influence of delay time can be further reduced to recognize speech more accurately when speech is recognized using speech models belonging to any of speech needed groups 402.

The second embodiment of the present invention will now be described.

In this embodiment, as shown in FIG. 1, the speech recognition device according to the present invention is applied for recognition of speech of a relatively long word sequence such as an address using the speech model network having a plurality of speech models linked thereto, and is different from the above first embodiment in that speech models are constructed from speech model templates.

In the speech model storage unit 110, instead of speech models belonging to the speech model group 402, kana character strings indicating pronunciations of specified speech capable of being recognized by the speech models are stored, and speech model templates capable of constructing speech models based on the kana character strings are stored in a number of speech models belonging to the speech model group 402.

The matching unit 114 reads speech models belonging to the first speech model network 300, the garbage model 350, kana character strings and speech model templates from the speech model storage unit 110, and loads the read speech models, garbage model 350, kana character strings and speech model templates in the RAM 112.

Then, if speech models belonging to any of speech model groups 402 are loaded into the RAM 112, speech models are constructed from speech model templates in the RAM 112 based on those of kana character strings in the RAM 112, which correspond to speech models to be loaded into the RAM 112.

If speech is recognized using HMM, it is eventually required to convert a word desired to be recognized, for example "Hokkaido" into the HMM sequence. In this case, "Hokkaido" is first converted into phoneme sequences "h, q, ts, k, a, i, d, o, u". Then, the phoneme sequences "h, q, ts, k, a, i, d, o, u" may be further divided into more precise phoneme sequences but eventually, HMM sequences corresponding to respective phoneme sequences are created.

In the example of FIGS. 2A and 2B, 3 HMM states are assigned to each phoneme sequence. That is, it means that character data of "Hokkaido" have 9 (phoneme sequences) .times.3 (number of states)=27 states. "Hokkaido" is equivalent to data of 6 (Byte) if expressed with half-size characters. Each state of HMM is equivalent to 27.times.2=54 (Byte) if each is expressed with 2 (Byte).

Furthermore, for data of the speech model network, speech model-to-speech model link information (grammar or rule) is described. For example, the word of "Hokkaido" is information linked to "names of cities, towns and villages of Hokkaido". Further, if the recognition result is given back as ID of the word when the word is recognized, the ID value or the like of the word may be included. In addition, in speech recognition, additional data is included as data of the speech model network.

Thus, if the case where speech models are loaded directly in the RAM 112 is compared with the case where kana character strings and speech model templates are loaded into the RAM 112 and then only speech models required for recognizing speech are constructed, the latter requires less memory capacity.

The operation of this embodiment will now be described.

Here, the operation will be described taking, as an example, recognition of speech of a relatively long word sequence such as an address for use in a car navigation or the like.

For recognizing speech, by the matching unit 114, speech models belonging to the first speech model network 300, the garbage model 350, kana character strings and speech model templates are read from the speech model storage unit 110, and the read speech models, garbage model 350, kana character strings and speech model templates are loaded into the RAM 112.

In this state, when speech from a person is input from the microphone 102, the input speech from the microphone 102 is A/D-converted by the A/D converter 104, the speech parameter is extracted from speech data converted by the A/D converter 104 by the speech parameter extraction unit 106, and the extracted speech parameter is written into an address indicated by the write pointer in the ring buffer 108. In this way, the speech parameter is circularly written into the ring buffer 108 in the order of extraction from the speech parameter extraction unit 106.

Then, by the matching unit 114, the speech parameter is read from an address indicated by the read pointer in the ring buffer 108, and the read pointer is incremented by 1. At this time, when the read pointer reaches the address at the end of the storage area, the read pointer is set to an address at the head.

Then, the read speech parameter is given to speech models in the RAM 112. When the occurrence probability output from the garbage model 350 is equal to or greater than a predetermined value, a label sequence, of which the accumulated value of occurrence probability is the highest, is specified as a first recognition speech model from the first speech model network 300.

Then, speech models belonging to one of speech model groups 402 to be linked to the end of the first recognition speech model and the pose 404 should be loaded into the RAM 112 but in this case, speech models are constructed from speech model templates in the RAM 112 based on those of kana character strings in the RAM 112, which correspond to speech models to be loaded into the RAM 112.

Then, time required until a change in occurrence probability is propagated from the first recognition speech model to the garbage model 350 is calculated and, the read pointer of the speech parameter in the ring buffer 108 is rewound by a number corresponding to calculated required time. At this time, when the read pointer reaches an address at the head of the storage area, the read pointer is set to an address at the end. The purpose of rewinding the read pointer is to reduce the influence of delay time until the occurrence probability of the garbage model 350 becomes equal to a predetermined value.

The speech parameter is read from an address indicated by the read pointer in the ring buffer 108, and the read speech parameter is given to speech models in the RAM 112. A speech model, of which the accumulated value of occurrence probability is the highest, is thus specified as a second recognition speech model from the speech model group 402.

EXAMPLE

Example of the present invention will now be described. Conditions such as the number of words are same as those in the Example described above.

If all speech models belonging to the first speech model network 300 and the second speech model network 400 are loaded into the RAM 112 to recognize speech as in the conventional technique, the memory capacity required for loading speech models is about 20 (MByte), and the memory capacity required for speech recognition processing with the Viterbi algorithm or the like is about 1 (MByte), resulting in consumption of total 21 (MByte) of memory capacity.

On the other hand, if speech models belonging to the first speech model network 300 and the garbage model 350 are loaded into the RAM 112 to recognize speech in the pre-stage, and speech models are constructed from speech templates based on kana character strings to recognize speech in the post-stage as in the present invention, the memory capacity required for loading speech models is about 0.86 (MByte), and the memory capacity required for speech recognition processing with the Viterbi algorithm or the like is about 0.5

(MByte), resulting in consumption of total 1.36 (MByte) of memory capacity. Thus, the required memory capacity could be reduced by 93% compared to the conventional technique.

In this way, in this embodiment, if speech models belonging to any of speech model groups 402 are loaded into the RAM 112, the matching unit 114 constructs speech models from speech model templates in the RAM 112 based on those of kana character strings in the RAM 112, which correspond to speech models to be loaded into the RAM 112.

In this way, the speech model template generally has a small data capacity compared to the speech model and therefore by dynamically loading speech models when required, the memory capacity required for recognizing speech can be further reduced. Furthermore, for performing a series of speech recognition, time required for reading speech models can be reduced because speech models are not read from the speech model storage unit 110.

In the second embodiment described above, the RAM 112 corresponds to the speech model loading storage means, the matching unit 114 corresponds to the speech recognition means, and the speech model group 402 corresponds to the second speech model group, or the third speech model group. Furthermore, the kana character string corresponds to the pronunciation indicating character string.

In the second embodiment described above, the matching unit 114 reads speech models belonging to the first speech model network 300, the garbage model 350, kana character strings and speech model templates from the speech model storage unit 110, loads the read speech models, garbage model 350, kana character strings and speech model templates in the RAM 112, and constructs speech models from speech model templates in the RAM 112 based on those of kana character strings in the RAM 112, which correspond to speech models to be loaded into the RAM 112, if speech models belonging to any of speech model groups 402 are loaded into the RAM 112, but the present invention is not limited thereto, and for kana character strings or speech model templates, only those required for speech recognition in the post-stage (speech recognition by the second speech model network 400) may be read in the RAM 112.

Furthermore, in the first and second embodiments described above, the garbage model 350 is linked to the rear of the first speech model network 300, but the present invention is not limited thereto, and the garbage model 350 maybe linked to the front of the first speech model network 300, and speech models belonging to any of speech model groups 402 may be loaded into the RAM 112 based on the occurrence probability output from speech models belonging to the first speech model network 300.

Furthermore, in the first and second embodiments described above, at the time of switching between speech model networks, a speech model network matching a desired number of candidates can be built to perform recognition processing if the garbage model 350 can have a plurality of history information. In the example of recognition of names of places described above, if the first candidate obtained in the first speech model network 300 is the label sequence of "Kanagawaken Fujisawashi" and the second candidate is the label sequence of "Kanagawaken Atsugishi", for example, a speech model network to be linked to the label sequence of "Kanagawaken Fujisawashi" and a speech model network to be linked to the label sequence of "Kanagawaken Atsugishi" can be built, and the final recognition result can be output in consideration of each occurrence probability in one speech model network and each occurrence probability in the other speech model network.

Furthermore, in the first and second embodiments described above, the case where a control program stored in advance in the ROM 116 is always executed for realizing the functions of the speech parameter extraction unit 106 and the matching unit 114 has been described, but the present invention is not limited thereto, and from a storage medium storing a program indicating those procedures, the program may be read in the RAM 112 and executed.

Here, the storage media include semiconductor storage media such as RAMs and ROMs, magnetic storage type storage media such as FDs and HDs, optical read type storage media such as CDs, CDVs, LDs and DVDs, and magnetic storage type/optical read type storage media such as MOs, which include any storage media as long as they are readable by a computer regardless of read processes such as electronic, magnetic and optical processes.

Furthermore, in the first and second embodiments described above, the speech recognition device according to the present invention is applied for recognition of speech of a relatively long word sequence such as an address using a speech model network having a plurality of speech models linked as shown in FIG. 1, but the present invention is not limited thereto, and the speech recognition device can be applied for other cases within the bounds of not departing from the spirit of the present invention.

INDUSTRIAL APPLICABILITY

As described above, according to the speech recognition device according to the present invention, even if speech is recognized using a plurality of speech model groups having a link relationship, speech models of all secondary speech model groups are not required to be loaded, but only speech models of any secondary speech model group should be loaded into speech model loading storage means, thus making it possible to reduce the memory capacity required for recognizing speech compared to the conventional technique.

Further, according to the speech recognition device according to various embodiments of the present invention, speech models of both the second speech model group and third speech model group are not required to be loaded, but only speech models of any of the second speech model group and the third speech model group should be loaded in speech model loading storage means, thus making it possible to reduce the memory capacity required for recognizing speech compared to the conventional technique.

Further, according to the speech recognition device according to an embodiment of the present invention, speech models belonging to the first speech model group and unspecified speech recognizing speech models are removed from speech model loading storage means as speech models belonging to any of the second speech model group and the third speech model group are loaded into speech model loading storage means, thus making it possible to further reduce the memory capacity required for recognizing speech.

Further, according to the speech recognition device according to several embodiments of the present invention, the required memory capacity can be reduced when speech is recognized using a plurality of speech model groups having a hierarchical link relationship with the first speech model group at the top level.

Further, according to the speech recognition device according to several embodiments of the present invention, some delay time is required until the occurrence probability of the unspecified speech recognizing speech model becomes equal to a predetermined value and therefore, by rewinding the position of read of the speech parameter in speech parameter storage means, the influence of delay time can be reduced to recognize speech relatively accurately when speech is recognized using speech models belonging to any of the second speech model group and the third speech model group.

Further, according to the speech recognition device according to several embodiments of the present invention, the position of read of the speech parameter is rewound by a number corresponding to time taken until a change in occurrence probability is propagated from the recognition speech model to the unspecified speech recognizing speech model, and therefore the influence of delay time can be further reduced to recognize speech more accurately when speech is recognized using speech models belonging to any of the second speech model group and the third speech model group.

Further, according to the speech recognition device according to an embodiment of the present invention, the position of read of the speech parameter is rewound by a number corresponding to time taken until a change in occurrence probability is propagated from the recognition speech model to the unspecified speech recognizing speech model with respect to the read position at the time of specifying the recognition speech model, and therefore the influence of delay time can be further reduced to recognize speech more accurately when speech is recognized using speech models belonging to any of the second speech model group and the third speech model group.

Further, according to the speech recognition device according to an embodiment of the present invention, the speech model template generally has a small data capacity compared to the speech model, and therefore by dynamically loading speech models when required, the memory capacity required for recognizing speech can be further reduced.

The invention claimed is:

1. A speech recognition device for recognizing an input speech of a word sequence based on a plurality of speech models which are modeled so that a possibility that a specified word or words are contained in the input speech is output as an occurrence probability based on a speech parameter, the speech recognition device comprising:
    a first speech model network for specifying a linking relationship among a plurality of first speech model groups, in which the speech models are grouped to include different specified words, the word sequence being a segment of continuous speech;
    a garbage model connected to the first speech model network for increasing the occurrence probability when a speech parameter is given corresponding to speech other than the specified words, which can be recognized by the speech models of the first speech model network;
    a second speech model network for specifying a second speech model group, in which the speech models are grouped to have common linking relationship to the speech models of the first speech model network;
    a speech model storage unit for storing the first speech model network, the garbage model, and the second speech model network;
    a data storage unit;
    a speech parameter extraction unit for extracting a speech parameter for the input speech;
    a speech parameter storage unit for storing the extracted speech parameter; and
    a matching unit for recognizing speech based on the speech models of the first speech model network and the second speech model network, the garbage model, and the speech parameter stored by the speech parameter storage unit, the matching unit comprising:
    a loading unit for loading the speech models of the first speech model network, and the garbage model into the data storage unit;
    a first occurrence probability accumulating unit for accumulating the occurrence probabilities by giving the speech parameter stored in the speech parameter storage unit to the first speech model network and the garbage model loaded into the data storage unit;
    a speech model network switching unit for selecting the second speech model network based on the accumulated occurrence probability of the speech models of the first speech model network when an occurrence probability output from the garbage model exceeds a predetermined value, and then loading the speech model of the selected second speech model network into the data storage unit;
    a readout position rewinding unit for rewinding a readout position of the speech parameter in the speech parameter storage unit by a predetermined number; and
    a second occurrence probability accumulating unit for reading out the speech parameter from the rewound readout position and accumulating the occurrence probability by giving the read out speech parameter to the loaded speech models of the selected second speech model network.

2. A speech recognition device as recited in claim 1, wherein the predetermined number is the number of frames in which the occurrence probability is accumulated in the garbage model by the predetermined value.

3. A speech recognition device as recited in claim 1, wherein:
    the speech model network switching unit specifies as a recognition speech model the speech model having a highest accumulated occurrence probability in the speech models of the first speech model network, loads into the data storage unit the speech model of the second speech model network having linking relationship with the recognition speech model, and calculates the number of frames for which the occurrence probability is accumulated between the end of the recognition speech model and the garbage model; and
    the readout position rewinding unit uses the calculated number of frames as the predetermined number.

4. A speech recognition device as recited in claim 3, wherein the readout position rewinding unit rewinds the readout position of the speech parameter by the calculated number of frames from the readout position at the time when the recognition speech model is specified.

5. A speech recognition device as recited in claim 1, wherein:
    instead of the speech models belonging to the first speech model network and the second speech model network, the speech model storage unit stores a pronunciation indicating character string indicating a pronunciation of the specified words that the speech models can recognize and a speech model template that can constitute the speech model based on the pronunciation indicating character string; and
    the matching unit constitutes the speech model from the speech model template, based on the pronunciation indicating character string corresponding to the speech model to be loaded into the data storage unit, when the speech model belonging to one of the first speech model network and the second speech model network is loaded in to the data storage unit.

6. A speech recognition device as recited in claim 1, wherein the matching unit specifies as a first recognition speech model the speech model having a highest occurrence probability in the first speech model network, specifies as a second recognition speech model the speech model having a highest occurrence probability out of ones loaded into the data storage unit in the second speech model network, and determines that a combination of a first specified word for the first recognition speech model and a second specified word for the second recognition speech model is contained in the input speech.

7. A speech recognition device as recited in claim 5, wherein the matching unit specifies as a first recognition speech model the speech model having a highest occurrence probability in the first speech model network, specifies as a second recognition speech model the speech model having a highest occurrence probability out of ones loaded into the data storage unit in the second speech model network, and determines that a combination of a first specified word for the first recognition speech model and a second specified word for the second recognition speech model is contained in the input speech.

8. A computer-readable storage medium having which, when executed by a processor, performs a method for recognizing speech of a word sequence based on a plurality of speech models and a speech parameter extracted from an input speech, in which the speech models are modeled so that a possibility that a specified word or words are contained in the input speech is output as an occurrence probability based on the speech parameter, the method comprising:
    allowing a first speech model network to specify linking relationship among a plurality of first speech model groups, in which the speech models are grouped to include different specified words, the word sequence being a segment of continuous speech;
    allowing a garbage model connected to the first speech model network to increase the occurrence probability when a speech parameter corresponding to speech other than the specified words, which can be recognized by the speech models of the first speech model network; is given;
    allowing a second speech model network to specify a second speech model group, in which the speech models are grouped to have common linking relationship to the speech models of the first speech model network;
    allowing a speech parameter extraction unit to extract a speech parameter from the input speech for each frame;
    allowing a speech parameter storage unit to store the extracted speech parameter; and
    allowing a matching unit to perform speech recognition based on the speech models of the first speech model network and the second speech model network, the garbage model, and the speech parameter stored by the speech parameter storage unit, the step of allowing a matching unit to perform speech recognition comprising:
        loading the speech models of the first speech model network and the garbage model into the data storage unit;
        accumulating the occurrence probability by giving the speech parameter stored in the speech parameter storage unit to the first speech model network and the garbage model loaded into the data storage unit;
        selecting the second speech model network based on the accumulated occurrence probability of the speech models of the first speech model network when an occurrence probability output from the garbage model exceeds a predetermined value;
        loading the speech models of the selected second speech model network into the data storage unit;
        rewinding a readout position of the speech parameter in the speech parameter storage unit by a predetermined number; and
        reading out the speech parameter started from the rewound readout position and accumulating the occurrence probability by giving the readout speech parameter to the loaded speech models of the selected second speech model network.

9. A method for a device for recognizing speech of a word sequence based on a plurality of speech models and a speech parameter extracted from an input speech, in which speech models are modeled so that a possibility that a specified word or words are contained in the input speech is output as an occurrence probability based on the speech parameter, the method including:
    modelling a first speech model network for specifying linking relationship among a plurality of first speech model groups, in which the speech models are grouped to include different specified words, the words contained in the word sequence in continuous speech;
    modelling a garbage model connected to the first speech model network for increasing the occurrence probability when a speech parameter corresponding to speech other than the specified words, which can be recognized by the speech models of the first speech model network, is given; and
    modelling a second speech model network for specifying a second speech model group, in which the speech models are grouped to have common linking relationship to the speech models of the first speech model network;
    extracting a speech parameter from the input speech for each frame;
    storing the extracted speech parameter into a speech parameter storage unit; and
    recognizing speech based on the speech models of the first speech model network and the second speech model network, the garbage model, and the speech parameter stored by the speech parameter storage unit, the step of recognizing speech comprising:
        loading the speech models of the first speech model network and the garbage model into the data storage unit;
        accumulating the occurrence probability by giving the speech parameter stored in the speech parameter storage unit to the speech models and the garbage model loaded into the data storage unit;
        selecting the second speech model network based on the accumulated occurrence probability of the speech models of the first speech model network when an occurrence probability output from the garbage model exceeds a predetermined value;
        loading the speech models of the selected second speech model network into the data storage unit;
        rewinding a readout position of the speech parameter in the speech parameter storage unit by a predetermined number; and
        reading out the speech parameter started from the rewound readout position and accumulating the occurrence probability by giving the readout speech parameter to the loaded speech model of the selected second speech model network.

* * * * *

UNITED STATES PATENT AND TRADEMARK OFFICE
CERTIFICATE OF CORRECTION

PATENT NO. : 7,487,091 B2
APPLICATION NO. : 10/513753
DATED : February 3, 2009
INVENTOR(S) : Toshiyuki Miyazaki It is certified that error appears in the above-identified patent and that said Letters Patent is hereby corrected as shown below:

In claim 5, column 24, line 67, "in to" should read --into--.

In claim 8, column 25, line 23, "medium having which," should read --medium which,--.

In claim 8, column 25, line 40, "network;" should read --network,--.

Signed and Sealed this

Eleventh Day of August, 2009

David J. Kappos
*Director of the United States Patent and Trademark Office*